Oct. 21, 1952     E. J. ARPS     2,614,743
TURNTABLE CONTROL MEANS FOR AERIAL LADDERS
Filed Sept. 28, 1946     7 Sheets-Sheet 1
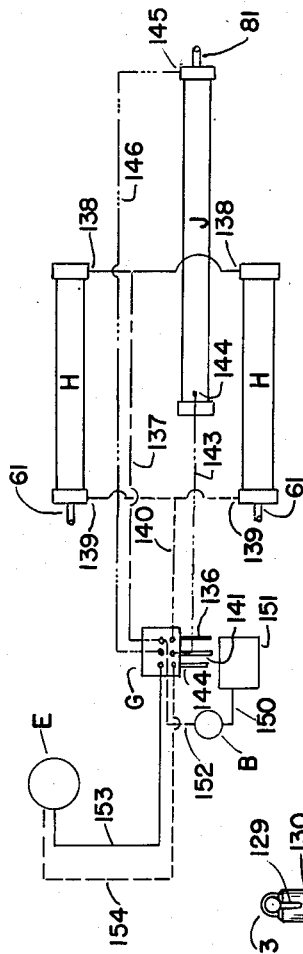
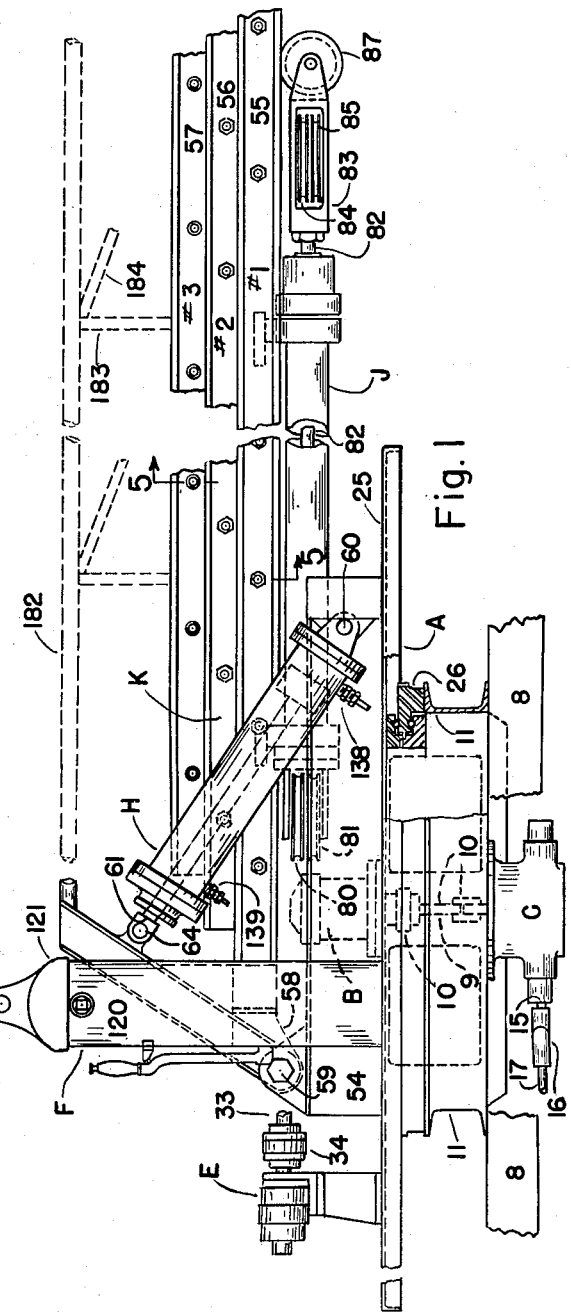
INVENTOR.
Edmund J. Arps
BY
*A.S.Krob*
ATTORNEY Oct. 21, 1952 — E. J. ARPS — 2,614,743
TURNTABLE CONTROL MEANS FOR AERIAL LADDERS
Filed Sept. 28, 1946 — 7 Sheets-Sheet 3

*INVENTOR.*
Edmund J. Arps
BY
*ATTORNEY*

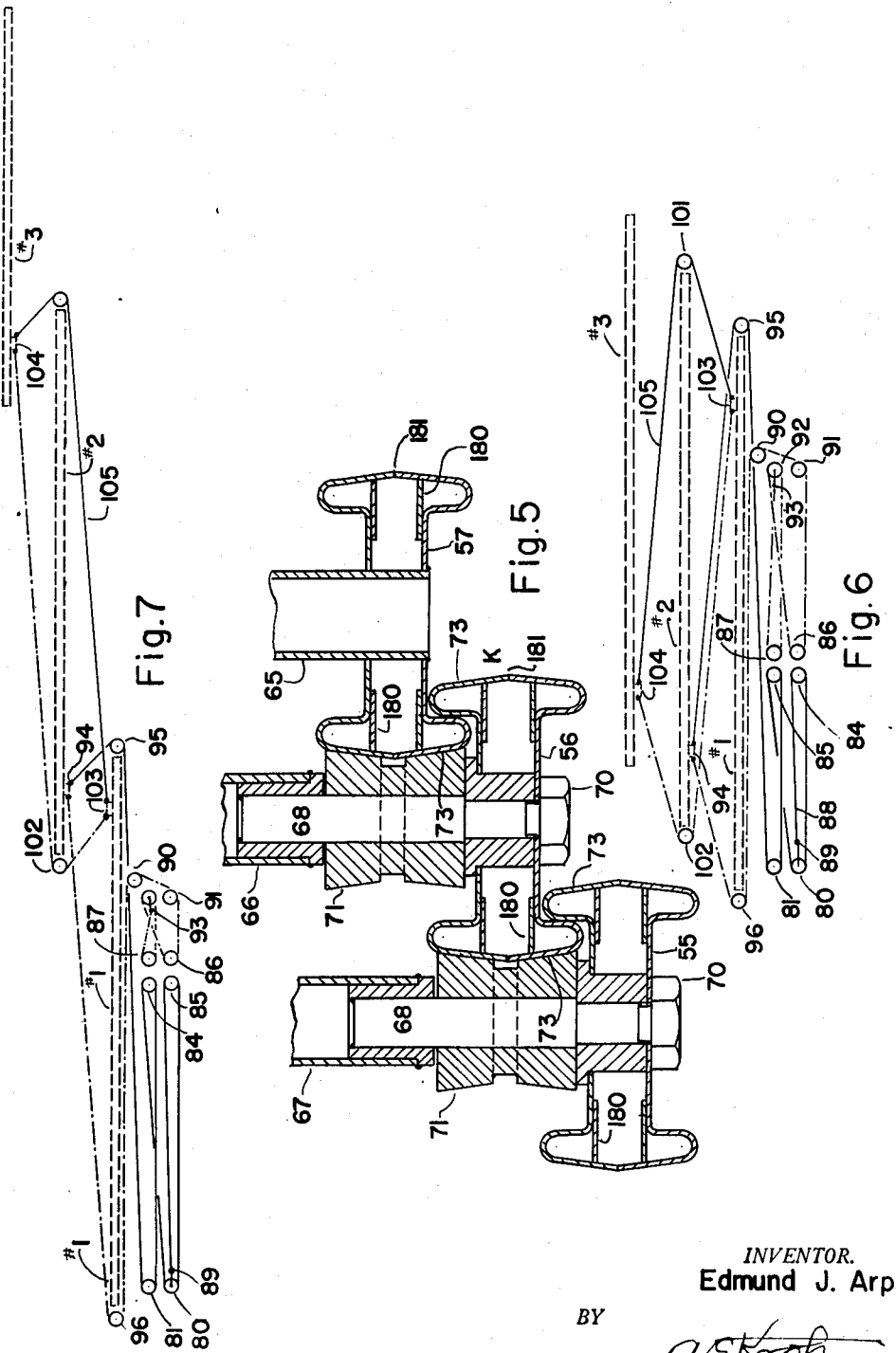

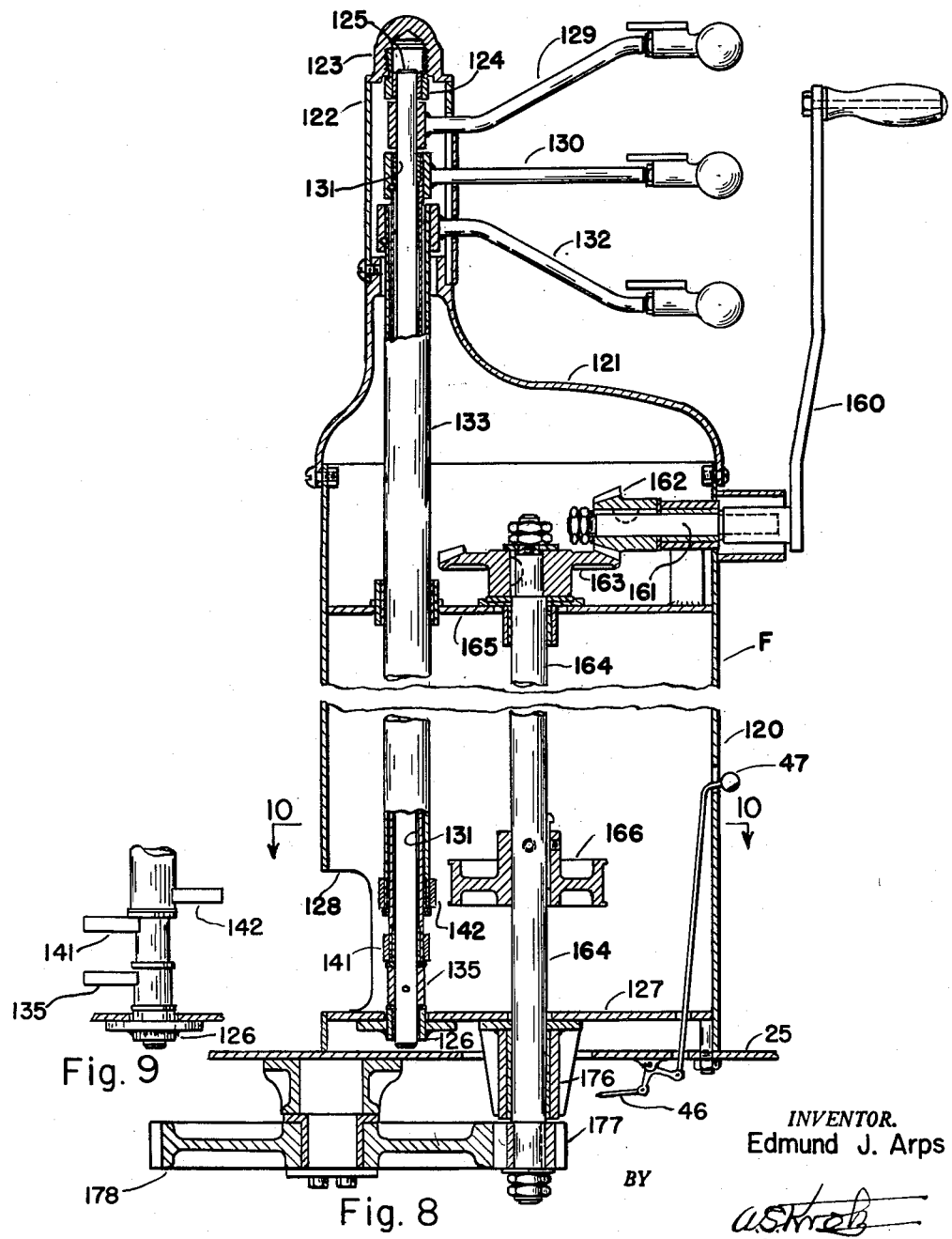

Oct. 21, 1952     E. J. ARPS     2,614,743
TURNTABLE CONTROL MEANS FOR AERIAL LADDERS
Filed Sept. 28, 1946     7 Sheets-Sheet 6
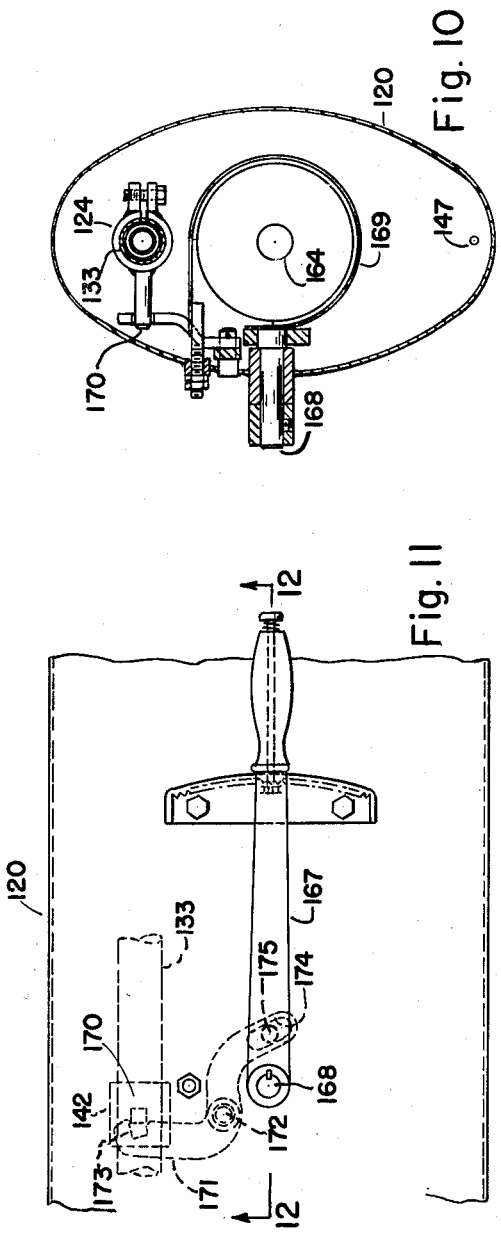
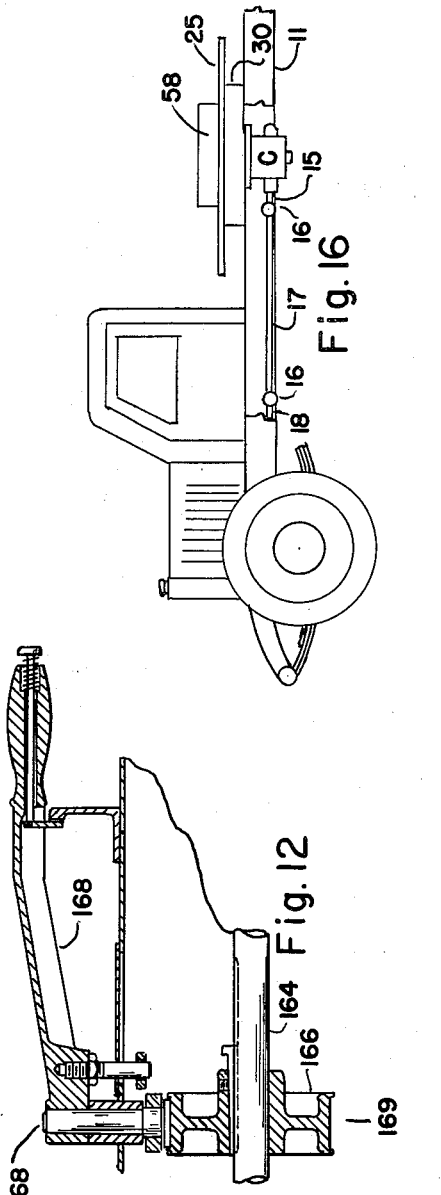
INVENTOR.
Edmund J. Arps

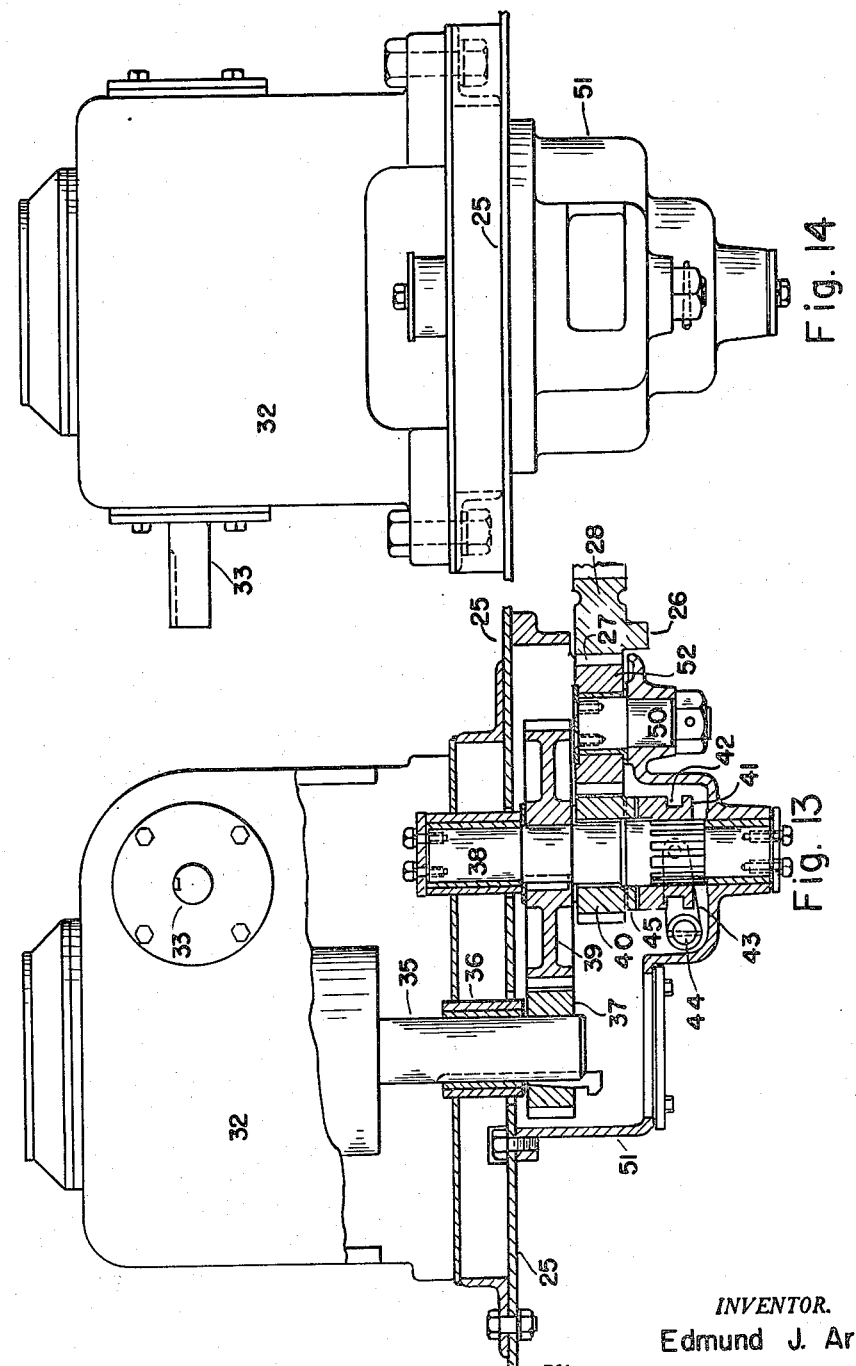

Patented Oct. 21, 1952

2,614,743

UNITED STATES PATENT OFFICE 2,614,743

TURNTABLE CONTROL MEANS FOR AERIAL LADDERS

Edmund J. Arps, Oshkosh, Wis., assignor, by mesne assignments, to Maxim Motor Company, Middleboro, Mass., a corporation of Massachusetts Application September 28, 1946, Serial No. 700,039

6 Claims. (Cl. 228—14)

The present invention relates to aerial ladders adapted to be mounted on a truck with means whereby a single operator can conveniently and safely control all of the operating parts of the device.

An object of the present invention generally stated is to provide a device of the character which is simple, can be easily manufactured at low cost and particularly adapted for emergency use.

An object of my invention is to provide a unitary device having a hydraulic pump with an operating connection to a gear in the truck transmission with means whereby the pump may be driven by the truck engine when the gear shift is in neutral and the truck clutch is engaged.

A further object of my invention is to mount on a turn table, a hydraulic motor and rams with means whereby when the truck motor is operating the operator can, from a standing or sitting position on the turn table, operate all of the units on the device hydraulically, namely, move the ladder from a horizontal to a vertical position and return, turn the turn table in either direction 360°, extend and retract the ladder, and by the use of a manually operated crank and a brake move the turn table a fraction of an inch for close movement of the free end of the ladder when extended. Furthermore the brake is used to hold the turn table from moving accidentally.

To these and other useful ends my invention consists of parts, combinations of parts or their equivalents and mode of operation as hereinafter described and claimed and shown in the accompanying drawings in which:

Fig. 1 is a side elevational view of my device arranged to be mounted on the chassis of a truck showing only fractions of the three sections of the ladder and the sections retracted.

Fig. 5 is a fractional section through the three ladder units and taken on lines 5—5 of Figure 1.

Fig. 6 is a diagrammatic drawing illustrating the ladder sections in a retracted position and illustrating the position of the pulleys and cables which are operated by the hydraulic cylinder.

Fig. 7 is a view similar to Figure 6 except with the sections of the ladder extended.

Fig. 8 is a rear view of the control pedestal taken on line 8—8 of Figure 2.

Fig. 9 is a fractional view of the levers operated by the control handles shown in Figure 8.

Fig. 10 is a transverse sectional view of the control pedestal taken on lines 10—10 of Figure 8.

Fig. 11 is a fractional rear view of the control pedestal illustrating the brake lever.

Fig. 12 is a section taken on line 12—12 of Figure 11, illustrating further details of the brake mechanism.

Fig. 13 is a rear view of the turn table operating motor showing its gear reduction parts in section.

Fig. 14 is a side elevational view of the device shown in Figure 13 with the operating motor detached.

Fig. 15 is a diagrammatic drawing illustrating the pipe line connections to the various hydraulic devices.

Fig. 16 is a diagrammatic drawing illustrating a fraction of an auto truck on which the frame and platform is shown and illustrating the preferred driving connection to the engine.

Figure 2:
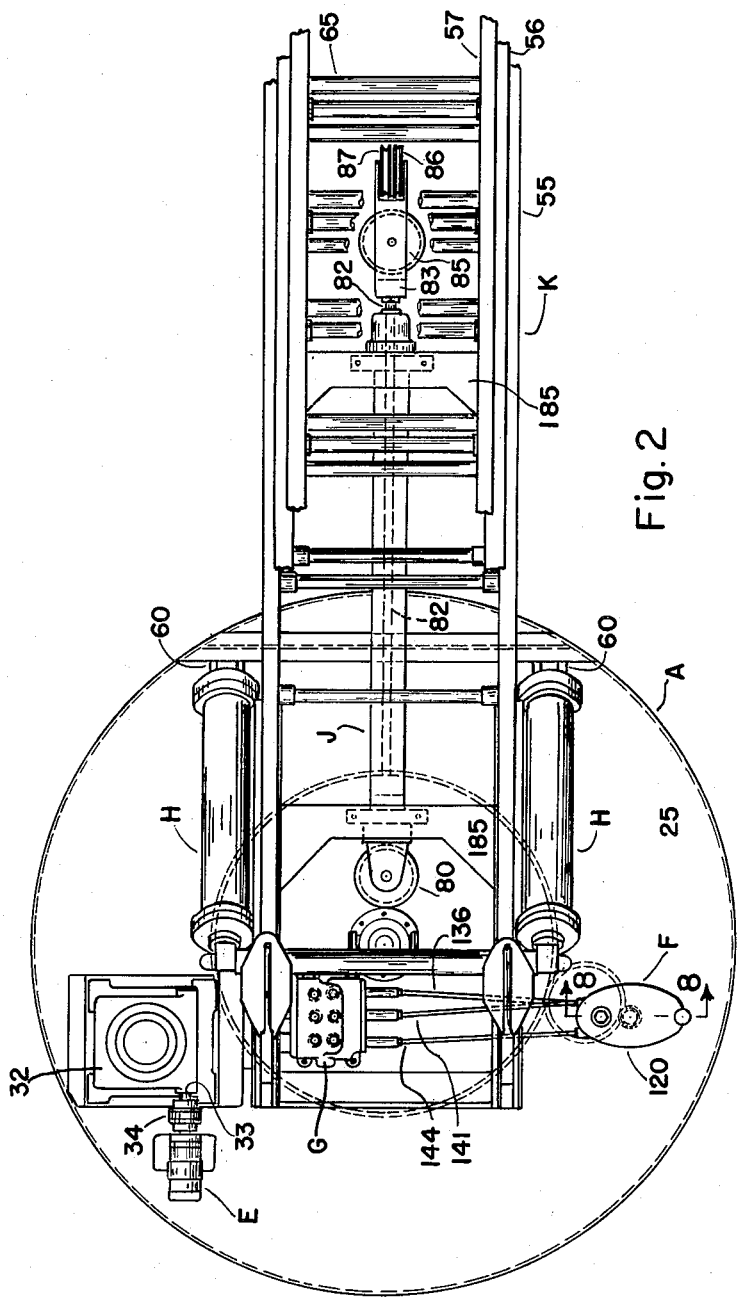
Fig. 2 is a top view of the device shown in Figure 1.

As thus illustrated, reference character A designates the turntable and its support in their entireties. Reference character B designates in its entirety the hydraulic pump. Reference character C designates in its entirety the transmission which acts as a drive for the hydraulic pump. Reference character E designates in its entirety the hydraulic motor adapted to turn the turn table in either direction. Reference character F designates in its entirety the control pedestal. Reference character G designates in its entirety the four way control valve. H—H designates in their entireties the hydraulic rams adapted to raise and lower the ladders. J designates in its entirety the hydraulic ram adapted to extend and retract the ladder sections. K designates in their entireties the three ladder sections.

Figure 4:
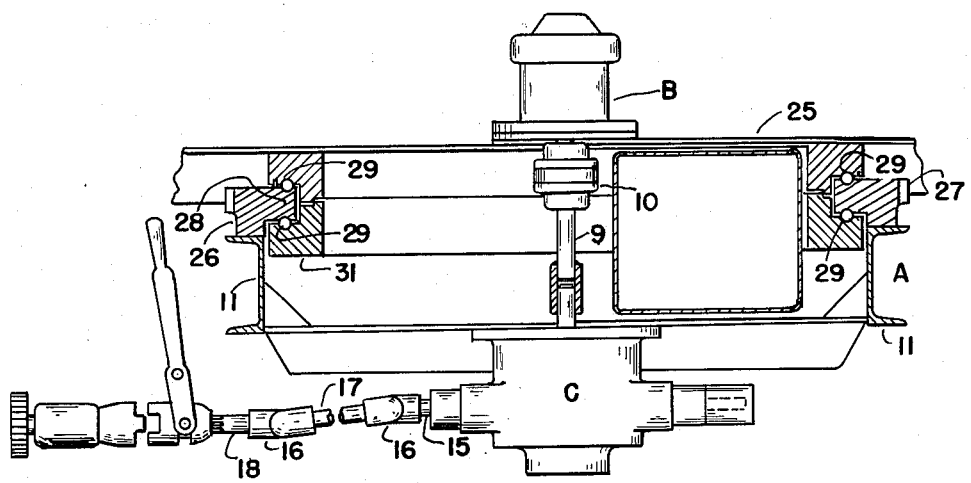
Fig. 4 is a detailed view of the turn table mounting on the frame which is adapted to be attached to the chassis of the truck.

All of the mechanism in applicant's device is operated hydraulically under manual control except the manual means for optionally turning the platform of unit A. I mount a hydraulic pump B on unit A in a concentric position with the turn table (see Figure 4). Member B has a downwardly extending shaft 9 with a flexible coupling 10, this shaft extends into the housing of member C which is mounted on the platform base 11 as illustrated and concentric with member B.

The transmission of trucks on which my device is mounted is provided with a clutch controlled drive shaft having an operating connection to shaft 18. This driving means is generally somewhat similar to that shown in Figure 4.

Thus when the truck is being driven to a fire, the jaw clutch may be disengaged and then after arriving at the fire the jaw clutch members may be engaged, the transmission thrown into neutral and the transmission clutch engaged so pump B will be driven by the engine and because of the position of members B and C the driving mechanism will not be influenced by the position of the platform which is in the drawing designated by reference numeral 25. The mounting of member 25 on member 11 is as follows:

A ring 26 is securely mounted on members 11 having external gear teeth 27 and an inwardly extending annular member 28 being suitably grooved for a large number of hardened steel balls 29—29. A ring 30 is secured to member 25 and a ring 31 is secured to ring 30, these rings also having grooves into which balls 29 fit. Thus the platform is free to turn on member 28.

Figure 3:
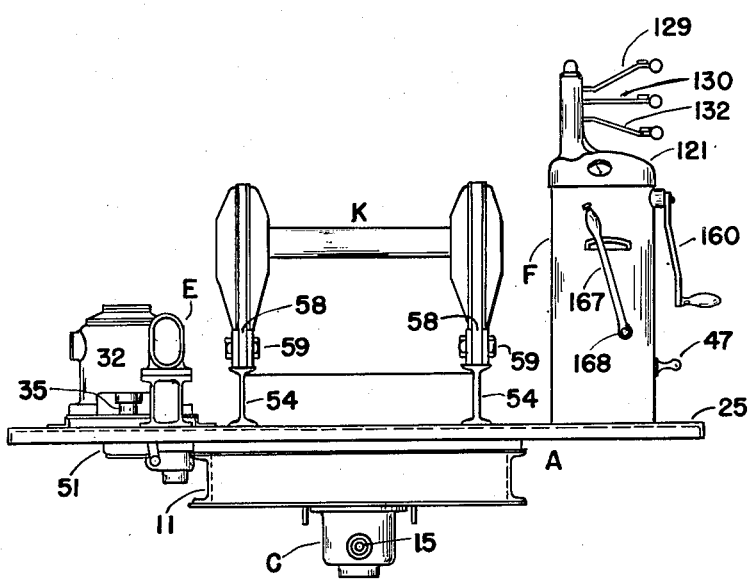
Fig. 3 is a front end view of the device shown in Figures 1 and 2.

I will now describe how motor E operates to turn the platform or turntable 25 on frame 11. The motor is mounted on the platform (see Figures 1, 2 and 3). A housing 32 is mounted on the platform having therein a gear reduction which forms an operating connection to shaft 35 from the motor by means of a shaft 33 and a flexible coupling 34. Shaft 35 is journaled in a bearing 36 and having secured to its lower end a pinion 37. A shaft 38 is rotatably mounted in housings 32 and 51 and has secured thereto a gear 39, the teeth of which mesh the teeth of pinion 37.

A pinion 40 is rotatably mounted on shaft 38. I spline mount a jaw clutch member 41 on shaft 38 having a groove 42 and an arm 43 which is forked and adapted to rotatably engage the groove. Arm 43 is rigidly mounted to a shaft 44. Member 41 is provided with jaws 45 on its upper end adapted to mesh jaws in the lower end of pinion 40; thus when member 41 is in its raised position, pinion 40 will be turned by shaft 38 and when member 41 is lowered, pinion 40 will be released. Shaft 44 has secured to its protruding end a suitable connection 46 to a manually operated shifting member 47 on member F (see Figure 8) whereby the operator can conveniently disconnect motor E from gear ring 26.

A shaft 50 is secured to housing member 51 and a pinion 52 is rotatably mounted on this shaft, the teeth of which mesh the teeth of pinion 40 and the teeth of ring 26. Thus it will be seen that when jaw clutch member 41 is raised as shown in Figure 13, pinion 52 will be caused to travel around ring 26 and carry the platform with it in either direction.

Assembly K generally comprises three ladder sections, each comprising pairs of rail members 55, 56 and 57. Members 55 are at their front ends secured to brackets 58—58 which are in turn pivoted to a sub-frame member 54 as at 59. Two transversely spaced hydraulic cylinders H are pivoted at their lower ends to sub-frame 54 as at 60—60. Each cylinder has a piston (see dotted lines) with protruding piston rods 61—61, the enlarged ends of which are pivoted to brackets 58 as at 64, so when the pistons in members H move upwardly and rearwardly member K will be raised on pivot 59, the arrangements being such as will make it possible to raise member K to a vertical position.

Member K includes three ladder sections 1, 2 and 3, each pair of side rails of these sections are connected together by means of suitably spaced rungs 65, 66 and 67. Members 66 are secured to members 56 by means of a shaft 68 and nuts 70 and members 67 are secured to members 55 in a similar manner. Rollers 71 are rotatably mounted on shafts 68 for reducing the friction between the ladder sections when being extended and retracted, the sections being held from coming apart by the overlapping flanges 73 of members 55, 56 and 57.

It will be seen that rungs 66 and 67 are detachable. Rungs 65 however are permanently secured to the side bars of the section by electric welding.

I will now describe the mechanism used for extending and retracting the ladder. A cylinder J is mounted on the lower or number 1 ladder section. On the forward end of this cylinder I rotatably mount two cable pulleys 80 and 81. Member J is provided with a piston (shown in dotted lines) having a piston rod 82 with a pulley block 83 secured to its protruding end. In this pulley block I rotatably mount cable pulleys 84 and 85 and on the end of the block I rotatably mount pulleys 86 and 87. By referring to Figure 6 it will be seen that cable 88 is anchored as at 89, either to member J or the number 1 ladder section. The cable first passes around cable pulley 84, then around cable pulley 80 then around cable pulley 85 and then around cable pulley 81.

From pulley 81 the cable extends to and around a pulley 95 which is anchored to the rear end of ladder section number 1, from pulley 95 the cable extends to and around pulley 96, then to and around pulley 90, then around a pulley 91, to and around pulley 86, then to and around pulley 92, then to and around pulley 87 and then to an anchor 93. Pulleys 90, 91 and 92 and anchor 93 are preferably mounted on the number 1 ladder section. The cable that passes from pulley 95 to pulley 96 is anchored to the number 2 ladder section as at 94.

Thus it will be seen that when the pulley block 83 is moved rearwardly, anchor 94 will be moved rearwardly and move number 2 ladder section rearwardly. The arrangement of pulleys being such as will cause ladder section number 2 to travel considerably faster than the movement of pulley block 83 or preferably at a ratio of 4 to 1 so number 2 ladder section may be moved from a retracted position to its full extended position.

It will be noted that the number 2 ladder section is positively moved in either direction by the movement of the piston in the cylinder. Connections and valves being provided whereby oil pressure may be fed into either end of the cylinder and discharged from either end as will hereinafter appear.

Applicant's device may be provided with two or three ladder sections. When it is provided with three ladder sections (as illustrated) a cable pulley 101 is rotatably mounted on the rear end of number 2 ladder section and a cable pulley 102 is rotatably mounted on the forward end of this ladder section. An anchor 103 is secured to ladder section number 1 near its rear end and an anchor 104 is secured to ladder section number 3 near its forward end. A wire cable 105 extends from anchor 103 to and around pulley 101 and is secured to anchor 104, this cable then extends to and around cable pulley 102 and then to anchor 103.

With this arrangement of pulleys and anchors, clearly ladder section number 3 may be the same length as section number 2 and therefore because of the arrangement of pulleys and anchors the travel of ladder section number 3 will be the same as the travel of ladder section number 2, as clearly indicated in Figures 6 and 7.

I will now describe my hydraulic controlling means which includes a control pedestal F, a control valve box G, an oil reservoir 151 and the necessary connecting tubes and rods.

Control pedestal F comprises a hollow standard 120 secured to platform 25 having secured at its top a cover 121 with an extension 122, the extension having a cap 123 and a bearing 124 in which the upper end of a shaft 125 is journaled, the lower end of the shaft being journaled in a bearing 126 mounted on a partition 127 secured to the lower end of member 120. Member 120 is cut away as at 128 for a purpose which will hereinafter appear.

A control lever 129 is secured to shaft 125; a lever 130 is secured to a tube 131 and lever 132 is secured to outer tube 133, the three levers extending through slots in member 122, and to the right as illustrated, the end of each lever having a ball hand grip as illustrated. Shaft 125 has secured to its lower end adjacent bearing 126, a lever 135 having a link connection 136 to the rear valve member in box G, the valve being arranged so when lever 129 is pulled forward or toward the operator, oil pressure will flow through tube 137 (see Figure 15) and into the lower end of cylinders H and out of these cylinders as at 139 into return tube 140, thus to raise the ladder toward a vertical position, the valve being arranged so when lever 129 is pushed rearward, the flow of oil will be reversed so as to lower the ladder sections. The center valve in member G has a mechanical connection 141 to lever 130 through tube 131, the valve being arranged so when lever 130 is pushed rearward oil pressure will flow into the front end of cylinder J through tube 143 as at 144 and back into the valve from the rear end of cylinder J as at 145 to the valve through tube 146, thus to extend the ladder. To retract the ladder, lever 130 is pulled forward.

To turn the platform 25 lever 132 is moved forward whereby motion will be imparted to tube 133, and lever 142 to the rear valve in member G through a mechanical connection 144 so oil will flow to motor E so the platform will be turned clockwise and by moving this lever rearward the motor will be turned so as to turn the platform anti-clockwise. The flow of oil to member E being through pipes 153 and 154.

Hydraulic pump B has a suction connection 150 from tank 151 and a discharge pipe 152 to the three valves of member G. The usual relief valve is furnished whereby a predetermined oil pressure is maintained.

Thus it will be seen that the operator, from his position on the platform, can at will raise and lower member K, extend and retract the ladder sections and turn the platform in either direction, that all of these imparted movements may be controlled by manipulating levers 129, 130 and 132; that these movements may be independent of each other or simultaneous, depending upon the desire of the operator.

At certain times especially when the ladder is extended to its full length, the operator may desire to move the free end of the ladder transversely a very short distance measured by inches, for obvious reasons. For this purpose I supply a hand brake for holding the platform from moving and a crank for turning the platform manually.

A crank 160 is detachably mounted on a shaft 161, the shaft being journaled on member 120 and having on its inner end a pinion 162 which meshes a gear 163 mounted on shaft 164. A partition 165 is provided into which tube 133 and shaft 164 are rotatably mounted. A brake drum 166 is mounted on shaft 164. A hand lever 167 is mounted on a shaft 168, shaft 168 is suitably connected to a brake band 169 whereby by pushing lever 167 to the right the brake will be engaged and shaft 164 held from turning. When the brake is engaged it is desired to hold tube 133 from turning, so as to prevent operating the hydraulic motor for turning the platform. This is accomplished by providing the hub of member 142 with an arm 170. A member 171 is pivoted near its center as at 172 to member 120, one end having a depression 173, the other end having a slot 174. A pin 175 is secured to lever 167 which is slidably engaged by slot 174.

Thus it will be seen that when lever 167 is moved to the right depression 173 will engage arm 170, thus holding lever 132 in its neutral position while the brakes are engaged. Shaft 164 is journaled in a bearing 176 and has secured to its lower end a pinion 177, this pinion has an operating connection with gear teeth 27, by means of a gear 178 arranged to reduce the movement of ring gear 26 relative to crank 160.

Thus it will be seen that in addition to the hydraulic means for turning the platform I have provided means for turning this platform manually and for holding the platform from turning by means of a manually operated brake and means whereby when the brake is engaged lever 132 will be locked in a neutral position.

The side rails of the ladder sections are each built up of a pair of preformed sections 55, 56 and 57. Compression strips 180 are electric welded to these sections after which the sections are electric welded together as at 181.

Referring to Figure 1, hand rails 182 are rigidly secured to the side rails of the ladder sections by means of vertical and diagonal braces 183 and 184, each ladder section is provided with a suitable number of cross braces 185. Thus each ladder section is one solid integral unit of extreme strength and rigidity, the hand rails forming a truss. Members 182, 183 and 184 are not shown in Figure 5 in order to simplify the drawing.

Clearly many minor detailed changes may be made without departing from the spirit and scope of my invention, the major objects of which are to supply a turntable capable of being moved around a circle of 360°; to supply a hydraulic pump and driving means from the transmission of the truck which will not interfere with the turning of the turntable; to supply hydraulic means for raising and lowering the ladder unit from a horizontal to a vertical position and to supply hydraulic means for extending and retracting the ladder sections; all such operations being associated with separate levers within reach of the operator whose position is on the platform and to supply a unit which can be conveniently mounted on the chassis frame of the truck and operatively connected to the engine of the truck.

It will be understood that mechanical means may be used for locking sections two and three against retracting while the ladder is being used.

Having thus shown and described my invention I claim:

1. In a fire apparatus a chassis, a ladder supporting turn table mounted on the chassis for rotation, power means operable to effect rotation of the table on the chassis, control mechanism movable from a neutral position to an operative position to initiate operation of the power means, a brake operable to lock the table against rotation, a handle for effecting operation of the brake, a block movable into and out of a position to intercept and block movement of the control mechanism from its neutral to its operative position, and means connected to the brake handle and operable thereby on applicacation of the brake to move the block into blocking position.

2. A fire apparatus according to claim 1, wherein the chassis has a ring gear on it, a pinion is mounted on the turn table in mesh with a reduction gear which in turn is in mesh with the ring gear, there is a pinion shaft fast to the pinion, there is mechanically operable means for effecting rotation of the pinion shaft and hence the table and the brake is applied to the pinion shaft.

3. A fire apparatus according to claim 1, in which the chassis has a ring gear, a pinion shaft is mounted on the table and has fast thereto a pinion which meshes with a reduction gear which in turn is in mesh with the ring gear, a brake drum is made fast to the pinion shaft, a brake band surrounds the brake drum and operation of the band is effected by said brake handle.

4. In a fire apparatus, a chassis, a ladder supporting turn table mounted on the chassis, a ring gear fast to the chassis, a pair of pinions mounted on the table, one of which is in mesh with the ring gear and the other of which is in mesh with a reduction gear which in turn meshes with the ring gear, power means for effecting rotation of one of said pinions, mechanical means for effecting rotation of the other of said pinions, control mechanism movable from a neutral position to an operative position to initiate operation of the power means, a brake operable to lock the mechanically operated pinion against rotation, a handle for effecting operation of the brake, a block movable into and out of a position to intercept and block movement of the control mechanism from its neutral position to its operative position, and means connected to the brake handle and operable thereby on application of the brake to move the block into blocking position.

5. In a fire apparatus according to claim 4, wherein the power means includes a valve-block containing a valve for controlling the power means, the control mechanism includes a shaft mounted on the table for rotation from a neutral position to an operative position, there is a lever for effecting rotation of the shaft, a link operably connects the shaft to the valve in the valve-block and said block intercepts rotation of the shaft.

6. In a fire apparatus a chassis, a ladder supporting turn table mounted on the chassis, a ring gear fast to the chassis, two pinions mounted on the turn table, one of which is in mesh with the ring gear and the other of which is in mesh with a reduction gear, the latter being in mesh with the ring gear, each pinion having a pinion shaft, a power operated motor connected to the pinion shaft of said one pinion for effecting rotation thereof, a valve-block and valve for controlling operation of the power motor, a control shaft on the table operably connected to the valve, means for effecting movement of the control shaft from a neutral position to an operable position to initiate operation of the power motor, manually operable mechanism on the table for effecting rotation of said second pinion shaft, a brake drum on said second pinion shaft, a brake band surrounds the brake drum, a brake lever for effecting operation of the band to constrict it on the drum to make the second pinion shaft fast against rotation, a tooth on the control shaft, a latch engageable with said tooth, and means connecting the latch to the brake lever and operable thereby to engage the latch with the tooth upon application of the brake.

EDMUND J. ARPS.

REFERENCES CITED

The following references are of record in the file of this patent:

UNITED STATES PATENTS

| Number | Name | Date |
|---|---|---|
| 677,874 | MacBeth | July 9, 1901 |
| 835,153 | Cooper | Nov. 6, 1906 |
| 1,410,190 | Kaiser | Mar. 21, 1922 |
| 1,483,231 | Maynard | Feb. 12, 1924 |
| 1,516,346 | Lemmer | Nov. 18, 1924 |
| 1,582,793 | Smith et al. | Apr. 27, 1926 |
| 1,589,093 | Barrett | June 15, 1926 |
| 1,771,333 | Joret | July 22, 1930 |
| 1,872,924 | Galanot | Aug. 23, 1932 |
| 1,886,783 | Bohlen, Jr. | Nov. 8, 1932 |
| 1,925,517 | Bohlen, Jr. | Sept. 5, 1933 |
| 1,926,697 | Murphy | Sept. 12, 1933 |
| 1,979,041 | Lundskow | Oct. 30, 1934 |
| 2,114,262 | Havens | Apr. 12, 1938 |
| 2,489,326 | Rockstrom et al. | Nov. 29, 1947 |